April 20, 1943.  W. H. OLIVER ET AL  2,317,108
FILTER
Filed Nov. 8, 1939  2 Sheets-Sheet 2
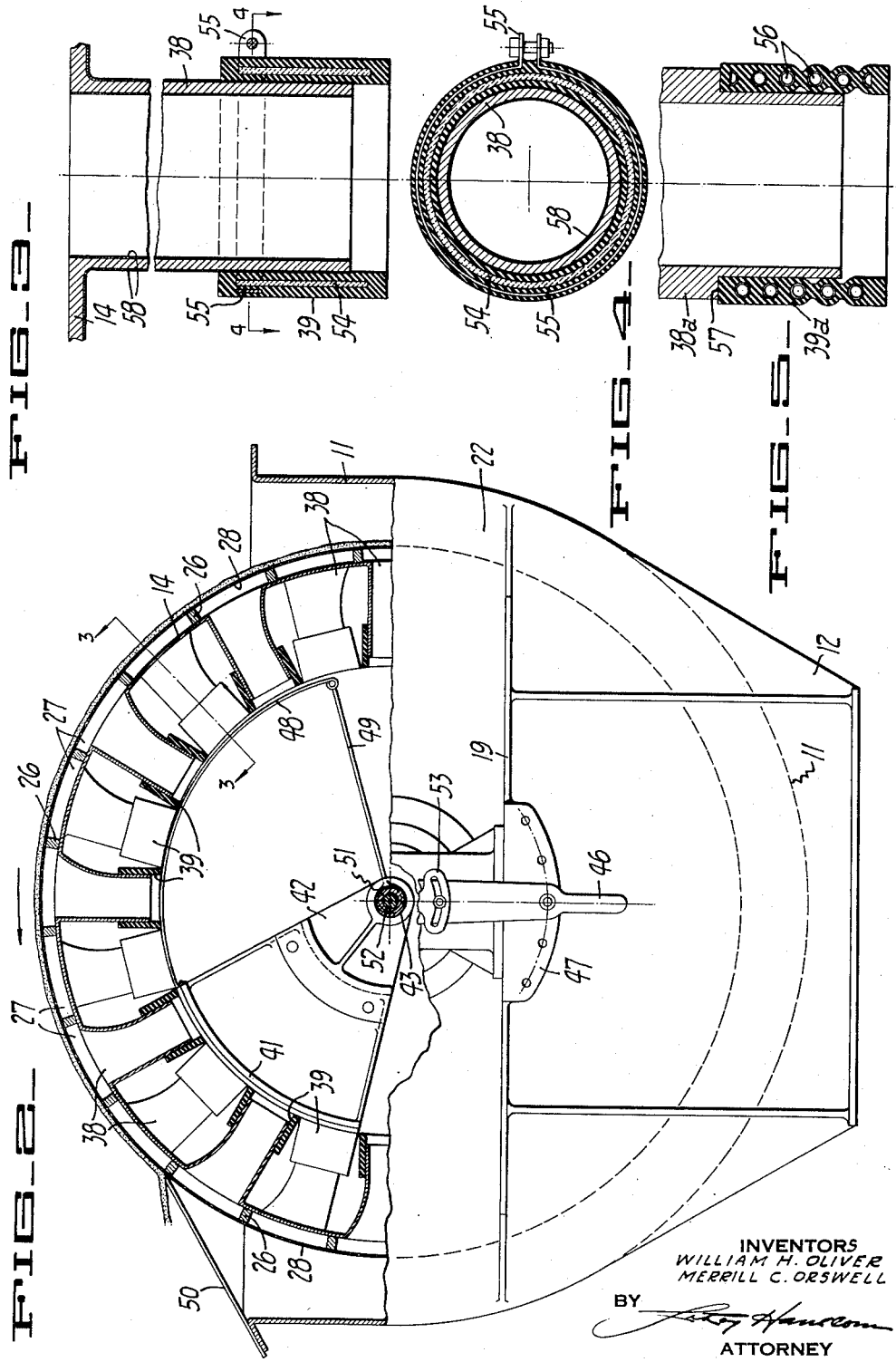
INVENTORS
WILLIAM H. OLIVER
MERRILL C. ORSWELL
BY
ATTORNEY Patented Apr. 20, 1943

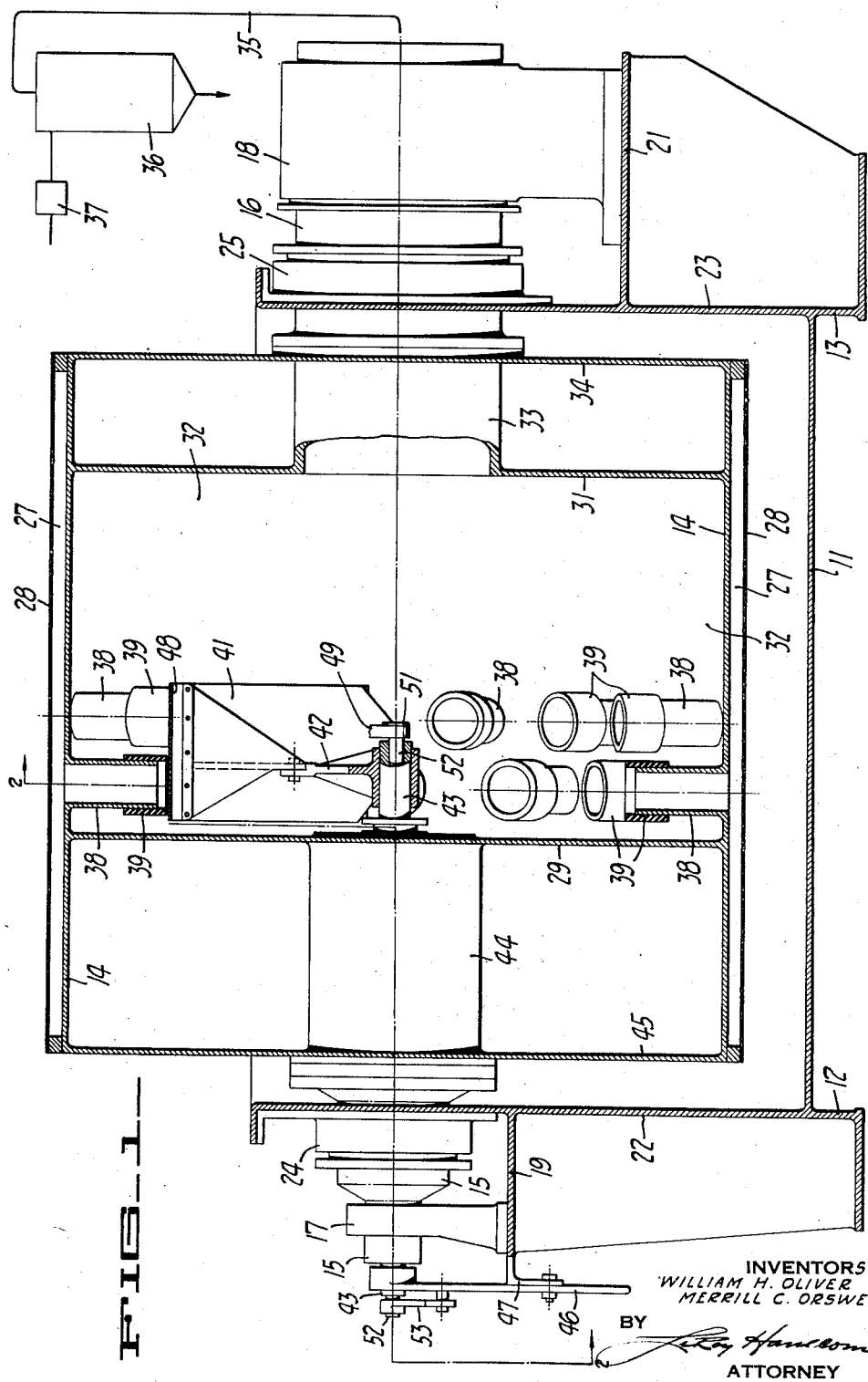

2,317,108

UNITED STATES PATENT OFFICE 2,317,108

FILTER

William H. Oliver, Oakland, and Merrill C. Orswell, Tujunga, Calif., assignors to Oliver United Filters Incorporated, Oakland, Calif., a corporation of Nevada Application November 8, 1939, Serial No. 303,428

7 Claims. (Cl. 210—202)

This invention relates in general to filters and in particular to a high capacity continuous filter wherein it is desired to equalize the differential filtering pressure at the point of discharge.

In conventional continuous rotary drum vacuum filters such as shown in U. S. Letters Patent No. 919,628, the filter drum is sectionalized by the formation on its outer surface of contiguous longitudinally extending filtrate compartments, each of which is made to communicate through piping extending within the drum with an automatic valve carried on one of the drum trunnions. By means of the automatic valve each of the compartments may be successively subjected to differential filtering pressure and to a blow back discharge pressure. While for many purposes a filter of this kind is satisfactory, it has been found that its limited internal capacity resulting from the piping establishing communication between the filtrate compartments and the valve, limits its use when it is desired to pass large volumes of liquid through the filter as is required for example when washing paper pulps.

To overcome this limitation our assignee, Oliver United Filters Incorporated, has developed a high flow filter wherein a differential pressure is always maintained between the exterior and interior of a totally enclosed drum provided on its outer surface with a plurality of longitudinally extending contiguous filtrate compartments, and wherein individual, gravity operated valves for cutting off communication between the interior of the drum and each filtrate compartment at the discharge zone are substituted for the conventional single automatic valve usually carried by one of the filter trunnions. In this manner and as shown in U. S. Letters Patent No. 2,152,156 issued to Frank W. Young, the piping ordinarily used to establish communication between the filtrate compartments and the automatic valve is eliminated and the internal capacity of the filter materially increased.

The filter forming the subject matter of this application is an improvement to the filter shown in the Young patent.

In general the object of this invention is the provision in a continuous sectionalized rotary drum filter wherein the drum is entirely closed and a differential filtering pressure continuously maintained between the exterior and interior of the drum, of a simple internal valve for gradually and successively equalizing the pressure between the exterior of the drum and each of the drum sections at the discharge zone.

More specifically the object of this invention is the provision of a rotary drum filter having a totally enclosed drum provided on its outer surface with a plurality of contiguous, longitudinally extending filtrate compartments each communicating with the interior of the drum through individual ports or nipples arranged to successively engage a fixed shoe at the discharge zone once during each cycle of operation.

Another object of the invention is the provision of adjustable means for gradually cutting off communication between each filtrate compartment and the interior of the drum once during each cycle of operation.

Still another object of the invention is the provision of an effective seal between the nipple and shoe above referred to.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is a vertical mid-section of a continuous, sectionalized rotary drum filter embodying the objects of my invention.

Figure 2 is a left hand end elevation of the filter shown in Figure 1.

Figure 3 is an enlarged section of a nipple or outlet taken on the line 3—3 of Figure 2.

Figure 4 is a section taken on the line 4—4 of Figure 3.

Figure 5 is a mid-section of a modified seal associated with the valve port and adapted to engage the fixed valve shoe.

As shown in these figures my invention is embodied in a continuous rotary drum vacuum filter comprising a tank 11 supported on pedestals 12 and 13. Rotatably mounted within the tank is a drum 14 carried by hollow trunnions 15 and 16 journaled in bearings 17 and 18. The bearings 17 and 18 may, as shown in Figure 1, be supported on brackets 19 and 21 formed integral with and extending outwardly from the tank heads 22 and 23 or may be mounted on an independent base. As is standard practice, stuffing boxes 24 and 25 are associated with the trunnions 15 and 16 and the tank heads 22 and 23 for the purpose of preventing leakage of pulp or slurry from the tank.

Defined by division strips 26 (Fig. 2) and formed on the outer surface of the drum 14 are a plurality of longitudinally extending independent, contiguous filtrate compartments 27 and covering these compartments is a layer of filter medium 28 sealed to each of the division strips 26. Although not shown the filter medium 28 is held spaced from the drum 14 not only by the division strips but also by a supporting or drainage screen of suitable construction.

For the purpose of strengthening the drum 14 and decreasing its internal capacity it is provided intermediate its ends with false ends 29 and 31 which with the drum define a central filtrate chamber 32. Communication between the chamber 32 and the hollow trunnion 16 is established through a pipe 33 carried by the false end 31 and the head 34 of the drum and the trunnion in turn communicates through suitable piping 35 and a vacuum receiver 36 with a vacuum pump 37.

Extending inwardly from each filtrate compartment 27 (preferably in staggered relation) is a pipe fitting or nipple 38 to the free end of which is adjustably secured a resilient collar or sleeve 39. Each of the sleeves 39 is secured to its associated nipple at a fixed and predetermined radius from the axis of the drum 14 and is adapted to register with an arcuate shoe 41 having a radius substantially equal to said predetermined radius. The shoe 41 is bolted to a bracket 42 keyed to a hollow shaft 43 extending through a pipe 44 secured between the false end 29 and the drum head 45 and through the hollow trunnion 15. Keyed to the outer end of the shaft 43 is a lever 46 adjustably secured to a graduated sector 47 carried by the bracket 19. By adjusting the angular position of the lever 46 a corresponding adjustment of the shoe 41 may be obtained so as to determine the zone in which the shoe seals the ends of the nipples 38. As shown in Figure 2 this zone is preferably on the descending side of the drum in angular alignment with a doctor 50 carried by the tank or other discharge device.

The shoe 41 is provided on its trailing or right hand edge as viewed in Figure 2 wherein the drum is indicated as having a counter-clockwise rotation, with a flexible extension 48 the radius of which gradually decreases from the shoe proper to its outer or free end so that the clearance between the sleeves 39 and the shoe extension 48 gradually increases from the inner to the outer end of the shoe extension. The shoe extension 48 may be riveted to the shoe 41, and is of considerable importance for as a given drum section 27 emerges from the pulp or slurry contained in the tank 11, the layer or sheet of solid material deposited on its filter medium is quickly freed of the greater portion of its free liquid content thereby leaving the sheet relatively porous. Under these conditions and in absence of the shoe extension 48 it would be very difficult to maintain a vacuum or differential pressure within the drum chamber 32. By the use of the shoe extension 48 the passage of fluid through the nipples 38 is gradually cut off as the filter sections approach the discharge zone and as the cake carried by them becomes more porous.

For the purpose of adjusting the clearance between the shoe extension 48 and the sleeves 39, the outer end of the shoe extension 48 is connected to the outer end of a link 49. The inner end of the link 49 is journaled on an eccentric 51 carried on the inner end of a shaft 52 concentrically journaled in the hollow shaft 43. Keyed to the outer end of the shaft 52 is a lever 53 adjustably secured to the lever 46. By rotating the lever 53 with respect to the lever 46 the clearance between the shoe extension 48 and its associated sleeves 39 may be regulated as desired.

If the nipples 38 are staggered as shown in Figure 1 the shoe and its extension are of course made of sufficient width to cover both circles of nipples. The diameter of the pipe 33 should be such as to permit access of an operator into the drum chamber 32 and the shoe and bracket 42 are made in separate pieces so that they may be introduced into the drum chamber through the pipe 33.

To make an effective seal between the sleeves 39 and the shoe 41 the sleeves as shown in Figure 3 are preferably made of rubber reinforced by several layers 54 of fabric. The sleeves 39 are adjustably secured to the nipples 38 by means of clamps 55 embodied within the sleeves.

In some cases, however, it may be desirable to adjust the sleeves 39 so that they have positive clearance with the shoe 41, for operation in this manner is quite feasible due to the fact that all of the parts involved are always coated with a liquid film which serves as a seal between the sleeves and the shoe.

Instead of making contact between the sleeves and shoe resilient by resorting to the use of a compressible sleeve, the same effect may of course be obtained by making the shoe resilient.

In Figure 5 a modified form of sleeve 39ᵃ has been shown, the resiliency of which is increased by a coil spring 56 embedded in it. The outer surface of the sleeve conforms in general to the adjacent sides of the spring and its upper end engages a shoulder 57 formed intermediate the ends of the nipple 38ᵃ.

For some purposes and as shown in Figures 3 and 4, it is advisable to coat the nipple 38 with a layer 58 of rubber, and the same protection should be given all exposed parts of the filter.

We claim:

1. A filter of the character described, comprising: a rotary drum; a filtrate compartment formed on the surface of said drum; a filtrate outlet depending from said compartment into said drum and arranged to rotate therewith; a stationary shoe fixed within said drum; and a sleeve of resilient material secured to said filtrate outlet with its open free end arranged for sliding and sealing engagement with the outer surface of said shoe without any substantial distortion of said sleeve.

2. A filter of the character described, comprising: a rotary drum; a filtrate compartment formed on the surface of said drum; a filtrate outlet depending from said compartment into said drum and arranged to rotate therewith; a stationary shoe fixed within said drum; a sleeve of resilient material secured to said filtrate outlet with its open free end arranged for sliding and sealing engagement with the outer surface of said shoe without any substantial distortion of said sleeve; and a spiral spring embedded in and coaxially with the outer end of said sleeve so as to increase the axial resiliency of the free end of said sleeve and thereby insure sealing engagement between said shoe and said sleeve.

3. A filter comprising: a closed rotary drum; a filtrate compartment formed on the surface of said drum; a stationary shoe fixed within said drum; a filtrate outlet extending from said compartment into said drum with its open free end arranged for sliding and sealing engagement with said shoe; an extension formed on the rear end of said shoe and gradually receding from the path traveled by the free end of said outlet so that as said outlet approaches said shoe its free end will be gradually closed; and means operable from the exterior of said drum for adjusting the clearance between said shoe extension and said outlet.

4. A filter comprising: a closed rotary drum; a filtrate compartment formed on the surface of said drum; a hollow shaft extending through one end of said drum and coaxially therewith; a shoe secured to said hollow shaft within said drum and formed on its rear end with a radially adjustable extension; a filtrate outlet extending from said compartment into said drum with its open free end arranged for sliding and sealing engagement with said shoe and for positive clearance with said shoe extension; a second shaft extending through said hollow shaft and provided on its inner end with an eccentric; a lever connected at one end to said shoe extension and at its other end to said eccentric so that rotation of the eccentric will adjust the clearance between the shoe extension and the free end of said filtrate outlet; and means external to said drum for independently rotating each of said shafts.

5. A continuous rotary differential pressure filter comprising a supporting member, a plurality of independent filtrate compartments rotatably supported by said member and forming a substantially endless filtering surface, means for supplying liquid to be filtered to said compartment, and a filtrate outlet secured to and extending away from the back of each of said compartments and arranged to rotate therewith in a closed path, means for maintaining an inwardly directed pressure between the exterior and interior of said filtrate compartments, a stationary shoe carried by said supporting member adjacent said closed path, and a sleeve of resilient material secured to each of said filtrate outlets with its open free end arranged for sliding and sealing engagement with said shoe, means to discharge the cake from said filtering surface while said outlet engages said shoe, the structural relation of the next to the last-named means, said shoe and said sleeve being such that movement of each sleeve over said shoe serves to reduce the effect of the inwardly directed pressure so as to permit the cake deposited on its associated filtrate compartment to be more readily discharged.

6. A continuous rotary differential pressure filter comprising a supporting member, a plurality of independent filtrate compartments rotatably supported by said member and forming a substantially endless filtering surface, means for supplying liquid to be filtered to said compartments, a filtrate outlet secured to and extending away from the back of each of said compartments and arranged to rotate therewith in a closed path, means for maintaining an inwardly directed pressure between the interior and exterior of said filtrate compartments, a stationary shoe carried by said supporting member adjacent said closed path, and a sleeve of resilient material secured to each of said filtrate outlets with its open free end arranged for movement over said shoe and with slight positive clearance therewith, means to discharge the filter cake from said filtering surface while the said sleeve is moving over said shoe, the structural relation of the next to the last-named means, said shoe and said sleeve being such that movement of each sleeve over said shoe serves to reduce the effect of the inwardly directed pressure so as to permit the cake deposited on its associated filtrate compartment to be more readily discharged.

7. A differential pressure filter comprising a rotary drum, a stationary shoe fixed within the drum, a filtrate compartment formed on the surface of said drum and having a filtering surface, means for supplying liquid to be filtered to said compartment, and a filtrate outlet extending from said compartment into said drum to a point just short of said shoe so as to rotate with positive clearance over said shoe, said clearance being such that it can be sealed by a film of water, means for maintaining an inwardly directed pressure between the exterior and interior of said filtrate compartment, means to discharge the filter cake from said filter surface while said outlet is rotating over said shoe, the structural relation of the next to the last-named means, said shoe and said outlet being such that movement of said outlet over said shoe serves to reduce the effect of the inwardly directed pressure so as to permit the cake deposited on its associated filtrate compartment to be more readily discharged.

WILLIAM H. OLIVER.
MERRILL C. ORSWELL.